United States Patent
Pagel et al.

(10) Patent No.: US 7,684,898 B2
(45) Date of Patent: Mar. 23, 2010

(54) METHOD FOR CALIBRATING A TOOL CENTER POINT OF TOOLS FOR INDUSTRIAL ROBOTS

(75) Inventors: Thomas Pagel, Wedemark (DE); Johannes Kemp, Braunschweig (DE)

(73) Assignee: Advintec GmbH, Laatzen (DE)

( * ) Notice: Subject to any disclaimer, the term of this patent is extended or adjusted under 35 U.S.C. 154(b) by 762 days.

(21) Appl. No.: 10/598,388

(22) PCT Filed: Feb. 16, 2005

(86) PCT No.: PCT/DE2005/000262

§ 371 (c)(1),
(2), (4) Date: Aug. 25, 2006

(87) PCT Pub. No.: WO2005/084895

PCT Pub. Date: Sep. 15, 2005

(65) Prior Publication Data

US 2008/0234863 A1  Sep. 25, 2008

(30) Foreign Application Priority Data

Mar. 3, 2004  (DE) .................. 10 2004 010 312

(51) Int. Cl.
*G05B 19/18* (2006.01)

(52) U.S. Cl. .................. 700/254; 700/166; 700/245; 702/150; 702/172

(58) Field of Classification Search ........... 700/245, 700/166; 356/375; 702/150

See application file for complete search history.

(56) References Cited

U.S. PATENT DOCUMENTS 4,662,752 A * 5/1987 Tucker et al. ............ 356/614

(Continued)

FOREIGN PATENT DOCUMENTS

DE  33 31 101 A1  8/1983

(Continued)

OTHER PUBLICATIONS

English Translation of WO/03059580—from European Patent Office.*

*Primary Examiner*—Khoi Tran
*Assistant Examiner*—Stephen Holwerda
(74) *Attorney, Agent, or Firm*—Whitham Curtis Christofferson & Cook, PC

(57) ABSTRACT

A method for calibration of a working point (TCP) for tools on industrial robots with a calibration device includes the use of at least two light barriers with an azimuth angle (α) greater than zero at an angle to each other and intersecting at an intersection point. The method includes fixing set TCP positional coordinates for a set working point for the tool, relative to a tool reference point and a TCP coordinate system relative to the working point, moving the tool to the set working point with relation to the TCP coordinate system through the light barriers, such that the tool tip interrupts the light barriers, recording actual TCP positional coordinates determining the difference between the set TCP positional coordinates for the interruption of the light barriers for a set working point and the corresponding recorded actual TCP positional coordinates for the actual working point, calculating the actual working point from the set working point for the number of levels of light barriers from the differences and the known position and azimuth angles (a) of the light barriers.

6 Claims, 2 Drawing Sheets

U.S. PATENT DOCUMENTS

| | | | |
|---|---|---|---|
| 4,831,549 A * | 5/1989 | Red et al. | 700/254 |
| 5,177,563 A | 1/1993 | Everett et al. | |
| 5,740,328 A * | 4/1998 | Ravani et al. | 700/258 |
| 5,929,584 A | 7/1999 | Gunnarsson et al. | |
| 6,352,354 B1 | 3/2002 | Boillot et al. | |

FOREIGN PATENT DOCUMENTS

| | | |
|---|---|---|
| DE | 37 24 656 A1 | 7/1987 |
| DE | 197 54 857 C2 | 12/1997 |
| DE | 102 30 772 A1 | 9/2002 |
| EP | 0 417 320 A1 | 3/1990 |
| EP | 0 824 393 B1 | 6/1999 |
| JP | 6-170768 | 7/1994 |
| JP | 11254359 | 9/1999 |
| WO | WO 03059580 A2 * | 7/2003 |
| WO | WO 2004/046734 A1 | 6/2004 |

* cited by examiner

METHOD FOR CALIBRATING A TOOL CENTER POINT OF TOOLS FOR INDUSTRIAL ROBOTS

BACKGROUND OF THE INVENTION

1. Field of the Invention

The invention relates to a method for calibrating a tool center point of tools for industrial robots comprising a calibration apparatus that has at least two light barriers which are angled to one another with a vertex angle α greater than zero in each case and cross one another at a crossing point, exhibiting the steps of:
  a) fixing ACTUAL TCP positional coordinates of a DESIRED tool center point of the tool with reference to a tool reference point of an industrial robot, and to a TCP coordinate system referred to the tool center point, and
  b) moving the tool with reference to the TCP coordinate system through the light barriers such that the tip of the tool corresponding to the tool center point interrupts the light barriers.

2. Description of Related Art

In order to approach any desired points within a working space, industrial robots have a number of interconnected arms, a hand flange at the end of the last arm of the mutually concatenated arms, and a tool that is fitted on the hand flange. The tool can be, for example, a gripper, a welding head or the like.

The position and orientation of the hand flange or the tool center point of a tool fitted on the hand flange can be specified in a stationary robot-independent world coordinate system, or in a stationary base coordinate system referred to an anchor point of the industrial robot. By contrast, the description of the position of the degrees of freedom, that is to say axes and the hand orientation, is done in robot coordinates, wherein starting from the principal axis of the robot, that is to say of the base coordinate system, there is defined for each arm an robot axis coordinate system that describes the relative position of each axis with reference to its preceding axis. The relationship of the robot axis coordinate systems of an industrial robot is described by defined coordinate transformations. By prescribing the position and the orientation of the hand flange or of the center point of a tool in the world coordinate system, it is therefore possible by means of coordinate transformation to calculate the robot axis coordinates in order to be able to drive the individual axes of the industrial robot.

The position of a center point of a tool that is fitted on the hand flange of the industrial robot is described by means of so-called TCP positional coordinates. The programming of the industrial robot is performed on the basis of the hand flange and the fixed TCP positional coordinates. The TCP positional coordinates are supplied along with each tool and are known as tool center point (TCP). Just like the robot axis coordinates, the TCP positional coordinates are in each case a vector with six dimensions. The first three coordinates define the position of the tool center point relative to the tool reference point of the industrial robot, that is to say the fastening point on the tool on the hand flange. The other three coordinates define the orientation of the axis of the tool center point relative to the tool reference point.

The center point of the tool can be, for example, the tip of a welding head. The center point of the tool can be moved precisely only once the TCP positional coordinates are exactly known.

However, during operation the center point of the tool can change owing to tool wear, bending etc., and this leads to defective positioning of the center point of the tool.

There is thus a need to calibrate the center point of tools with high precision.

EP 0 417 320 A1 describes a method for calibrating the center point (TCP) of the tool of an industrial robot in the case of which a setting point is fixed on the hand flange of the robot arm, the position of the setting point relative to the hand flange being known. Furthermore, a reference tip is set up in the working space of the industrial robot. In order to calibrate the tool center point, the tip of the tool is placed on the reference tip, and the position and orientation of the tool tip is determined in a base coordinate system. The setting point of the hand flange is then placed on the reference tip, and the position and orientation of the setting point is determined in the coordinate system of the hand flange. In addition, the position and orientation of the reference tip is determined in the reference coordinate system, and a transformation matrix is calculated from three matrices for the purpose of designating the TCP positional coordinates of the tool center point of the tool.

The calibration requires a multistage movement operation as well as coordinate transformations.

U.S. Pat. No. 6,352,354 B1 describes a light point element for generating a light point signal at a tool center point of an industrial robot. It is possible thereby to describe the exact position of the tool during a learning phase.

U.S. Pat. No. 5,929,584 describes a method for calibrating a tool center point of tools with the aid of a calibration block that has vertical and horizontal surfaces. The TCP positional coordinates of the tool center point are calculated by moving the tool from a starting position up to a contact position of the tool on one of the surfaces, and moving the tool back to the starting point and repeating the operation for the other surface. This disadvantageously requires a complicated coordinate transformation from the reference coordinate system via the individual robot coordinates up to the hand flange, in order to determine the TCP positional coordinates in the TCP coordinate system from the reference coordinates.

DE 37 24 656 T2 describes a multidimensional measuring machine with fork light barriers which meet at a crossing point. Because of the plurality of light barriers, which all lie in the same plane, it is possible to scan the tool in a contactless fashion from different directions but in the same scanning plane.

U.S. Pat. No. 5,177,563 discloses a fork light barrier for calibrating a robot arm in which the tool tip is moved until the latter lies at the crossing point of the light barriers and two light barriers are triggered simultaneously. The TCP positional coordinates at this crossing point are compared with DESIRED TCP coordinates and a deviation is determined therefrom. However, searching for the crossing point is wearisome.

BRIEF SUMMARY OF THE INVENTION

It is therefore an object of the invention to provide an improved method for calibrating a tool center point of tools for industrial robots.

The object is achieved according to the invention with the aid of the generic method by means of the further steps:
  c) recording ACTUAL TCP positional coordinates upon the interruption of a respective light barrier,
  d) determining the differences between the DESIRED TCP positional coordinates for the interruption of the light barriers at a DESIRED tool center point and the corresponding recorded ACTUAL TCP positional coordinates for the ACTUAL tool center point, and e) calculating the deviation of the ACTUAL tool center point from the DESIRED tool center point for the number of planes that is prescribed by the light barriers from the differences and the known position and vertex angles a for the light barriers.

It is therefore proposed from the known plane defined by the light barriers and the at least one vertex angle α the deviation of the ACTUAL tool center point from the DESIRED tool center point from the ACTUAL TCP positional coordinates for each axis of the coordinate system, which are fixed in each case upon interruption of a light barrier, in order to calculate onto the deviation of the tool center point for individual axes of the coordinate system. This eliminates the search for the crossing point in determining a tool center point. Rather, the robot can be moved into the calibration apparatus as if the DESIRED tool center point is to be reached directly by the tool tip. The deviations of the tool center point can then be determined from the temporally offset interruptions, occurring in the event of the displacement of the tool center point, of the individual light barriers, the orientation of which exhibits a relationship with the coordinate system of the industrial robot.

It is advantageous when subsequently the TCP positional coordinates are corrected by the calculated deviation of the ACTUAL tool center point from the DESIRED tool center point for the planes of a coordinate system, on which the TCP positional coordinates are based.

It is also particularly advantageous when the DESIRED tool center point is fixed with the aid of the TCP positional coordinates in the case of which the tool tip corresponding to the tool center point simultaneously interrupts all the light barriers at a common crossing point.

The invention becomes plainer with the aid of an advantageous embodiment in the case of which two light barriers are provided that cross one another at a vertex angle α of 90° and define a first plane of a coordinate system, the first light barrier corresponding to a first axis y, and the second light barrier corresponding to a second axis z of the coordinate system.

On the basis of the defined assignment of the light barriers to the first and second axes, the deviation of the tool center point can be determined for the first axis from the deviation, determined upon interruption of the first light barrier, of the ACTUAL tool center point from the DESIRED tool center point, and the deviation of the tool center point for the second axis can be determined from the deviation, determined upon interruption of the second light barrier, of the ACTUAL tool center point from the DESIRED tool center point.

If the TCP positional coordinates that are determined upon interruption of the light barriers are described in the same coordinate system, depending on tool bending, upon, for example, interruption of the first light barrier, the deviation of the y coordinate of the TCP positional coordinates would be determined, and upon interruption of the second light barrier the deviation of the z coordinate of the TCP positional coordinates would be determined and, if appropriate, the TCP positional coordinates would be appropriately corrected.

BRIEF DESCRIPTION OF THE DRAWINGS

The invention is explained in more detail below with the aid of the attached drawings, in which.

DETAIL DESCRIPTION OF THE INVENTION

Figure 1:
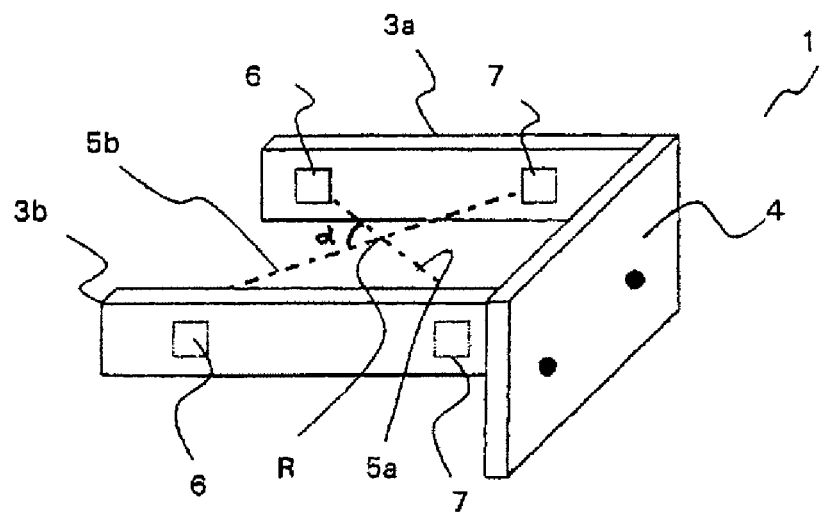
FIG. 1 shows a perspective view of a calibration apparatus according to the invention having two mutually crossing light barriers.

FIG. 1 shows a calibration apparatus 1 according to the invention in a perspective view. The calibration apparatus 1 has a frame that is open on one side and has two parallel limbs 3a, 3b spaced apart from one another. The calibration apparatus 1 is therefore U-shaped. The limbs 3a, 3b are integrally connected to a holding plate 4 with the aid of which the calibration apparatus 1 can be mounted in a stationary fashion in the working space of the industrial robot.

Provided in the limbs 3a, 3b are light barriers 5a, 5b that are aligned diagonally thereto and run up to one another at a vertex angle α of 90° and meet at a crossing point R in the interspace between the limbs 3a, 3b. To this end, in each case a transmitter 6 and one receiver 7 per light barrier 5a, 5b is fitted at a front end of a first limb 3a and at the rear end of the other limb 3b for the first light barrier 5a, and at the rear end of the first limb 3a and the front end of the second limb 3b for the second light barrier 5b.

This results in the creation of a fork light barrier that is preferably designed as an infrared light barrier.

Figure 2:
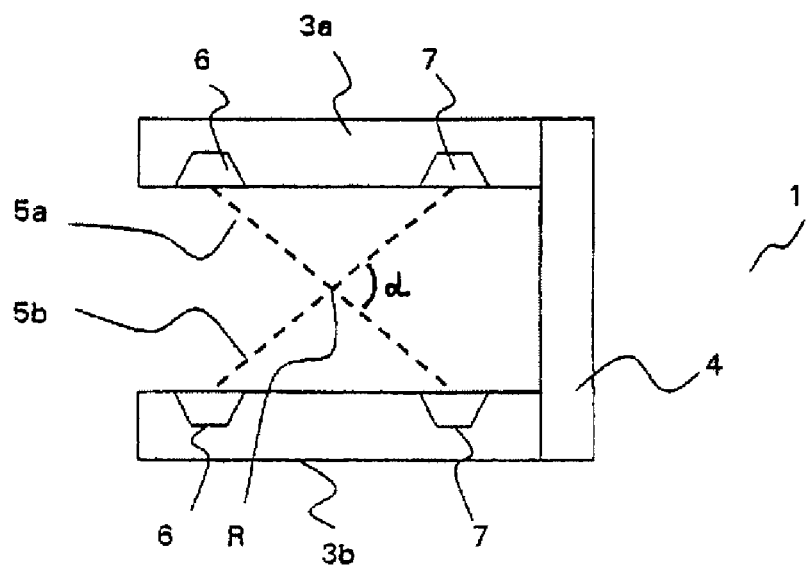
FIG. 2 shows a plan view of the calibration arrangement according to FIG. 1.

FIG. 2 shows the calibration apparatus 1 in plan view. It is plain that the light barriers 5a, 5b run diagonally between the limbs 3a and 3b and meet in the interspace of the limbs 3a, 3b at the crossing point R.

A center point TCP of a tool for an industrial robot, for example, the tool tip, is moved for the purpose of calibrating the tool center point TCP so as to approach a DESIRED tool center point $TCP_{DESIRED}$ that preferably lies at the crossing point R of the calibration apparatus 1. In this case, both light barriers 5a, 5b are interrupted by the tool tip such that a switching signal is generated.

The calibration method is explained in more detail below.

Figure 3:
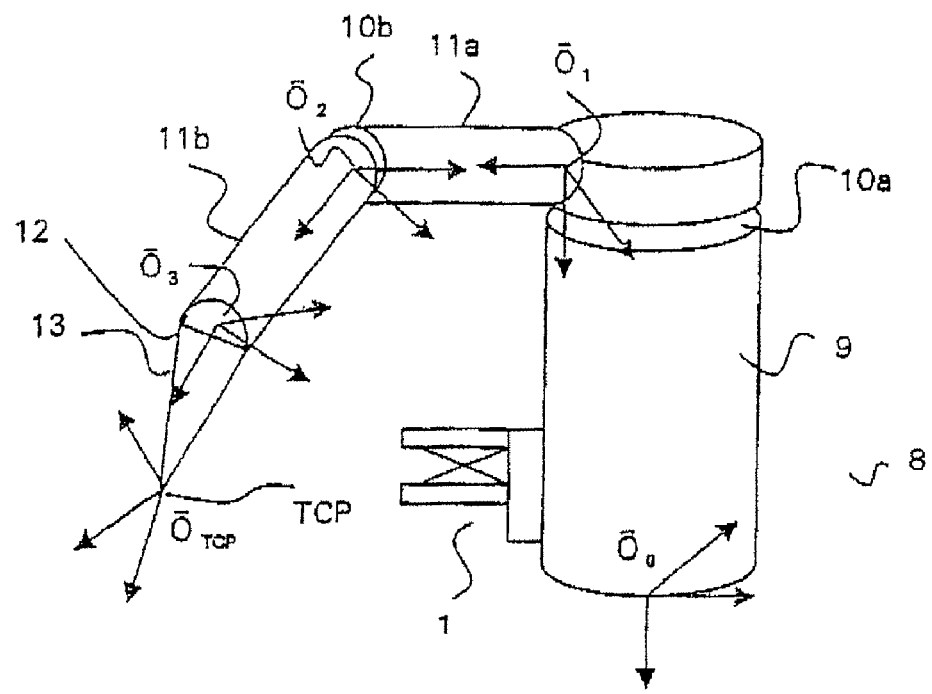
FIG. 3 shows a sketch of an industrial robot having a number of arms and a base coordinate system as well as axial coordinate systems.

FIG. 3 shows a sketch of an industrial robot 8. An industrial robot 8 has a base coordinate system $\tilde{O}_0$ or world coordinate system that is aligned in a stationary fashion with reference to the foundation of the industrial robot 8. Located on the base 9 is a chain of arms 11 interconnected via joints 10. Defined for each of these arms 11 is an axial coordinate system $\tilde{O}_1, \tilde{O}_2, \tilde{O}_3$ with the aid of which the position and orientation of the respective end of the corresponding arm 11 are described with reference to the assigned joint 10 with the aid of which the arm 11 is connected to the preceding arm 11.

A hand flange 12 on which the tool 13 is fitted is located at the end of the chain of arms.

A TCP coordinate system $\tilde{O}_{TCP}$ that has an origin at the center point TCP of the tool is fixed for the tool 13.

TCP positional coordinates that define the position and orientation of the tool center point TCP with reference to the tool reference point W on the hand flange 12, that is to say with reference to the fastening point of the tool 13 on the industrial robot 8, are provided for the tool 13 on the basis of this TCP coordinate system $O_{TCP}$.

In order to be able to calibrate the TCP positional coordinates during operation with reference to the tool reference point W of the industrial robot 8 quickly and with a low output on computation, the tip of the tool 13 is moved into the DESIRED tool center point $TCP_{DESIRED}$ of the calibration apparatus 1, which is mounted in stationary fashion, on the basis of the TCP coordinate system $\tilde{O}_{TCP}$. Consequently, there is an interpolation referred to the tool center point TCP, of the movement path during guidance of the tool 13 by the industrial robot 8. The origin of the TCP coordinate system $\tilde{O}_{TCP}$ is thereby held in a stationary fashion with reference to the fixed TCP positional coordinates of the tool center point TCP.

Upon interruption of the first light barrier, the TCP positional coordinates are fixed, and the deviation of the ACTUAL tool center point $TCP_{ACTUAL}$ from the DESIRED tool center point $TCP_{DESIRED}$ is determined for the axis y. Correspondingly, upon interruption of the second light barrier the deviation of the ACTUAL tool center point $TCP_{ACTUAL}$ from the DESIRED tool center point $TCP_{DESIRED}$ is determined for the second axis z. Taking account of the fact that the two light barriers define a common plane that was traversed on the third axis x at the zero point, these deviations of the first axis y and the second axis z correspond to the displacement of the tool center point TCP in three-dimensional space. The sequence of the interruption is determined by the tool bending and the traverse control.

The actual tool center point is determined by the center point between interruption and renewed release of a light barrier. In addition, the diameter of the tool can be determined for a duration of the interruption.

Thus, upon wear or bending of the tool 13 the displacement of the tool center point TCP can be determined directly in the TCP coordinates from the deviation, without an extended search for the crossing point R. A need to carry out complicated coordinate transformations is also eliminated.

Figure 4:
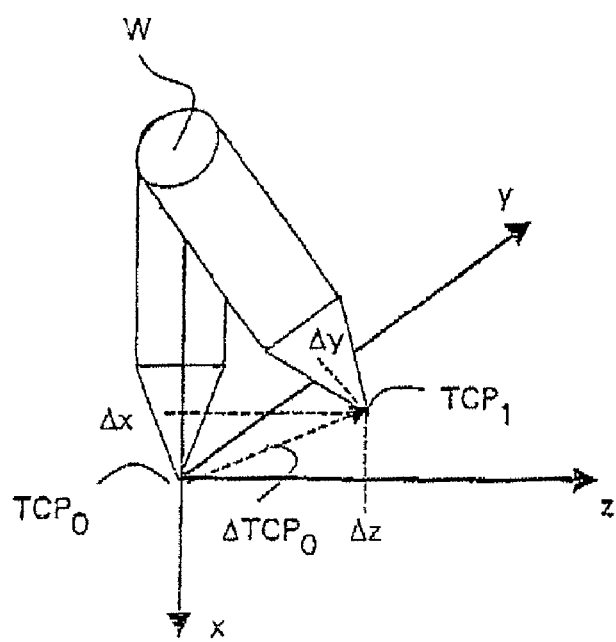
FIG. 4 shows a sketch of the displacement of the center point of a tool after wear with reference to a TCP coordinate system.

FIG. 4 shows the tool 13 with the TCP coordinate system $\tilde{O}_{TCP}$, of which the origin is at the center point TCP of the tool 13. In the case of the distortion of the tool that is sketched, the tool center point $TCP_1$ is displaced with reference to the previously fixed original tool center point $TCP_0$. The TCP positional coordinates are to be corrected by this displacement $\Delta TCP_0 = TCP_1 - TCP_0$ since, in accordance with the invention, the control of the industrial robot 8 is performed with reference to the TCP coordinate system $\tilde{O}_{TCP}$, the difference between the originally fixed TCP positional coordinates $TCP_0$ and the position of the new tool center point $TCP_1$ of a worn tool 13 is determined from the differences $\Delta y$ upon interruption of the first light barrier for the y axis, and $\Delta z$ upon interruption of the second light barrier for the z axis. Since the plane defined by the light beams arrives at x=zero, the deviation x can additionally be calculated with reference to the x value of the DESIRED tool center point.

Deviations of the tool length in the x direction can be determined, for example, by means of a second measurement travel by moving the tool into the light barriers that cross one another, doing so from above or below in the direction of the x axis.

If the light barriers do not coincide with the x, y and z axes, deviations in the direction of the x, y and z axes can be calculated from the known orientation of the light barriers and the vertex angle a by means of coordinate transformation.

The invention claimed is:

1. A method for calibrating a tool center point (TCP) of tools for industrial robots comprising a calibration apparatus that has at least two light barriers which are angled to one another with a vertex angle ($\alpha$) greater than zero in each case and cross one another at a crossing point (R), exhibiting the steps of:
    a) fixing DESIRED TCP positional coordinates of a DESIRED tool center point ($TCP_{DESIRED}$) of the tool with reference to a tool reference point (W) of an industrial robot, and to a TCP coordinate system referred to the tool center point (TCP),
    b) moving the tool directly to the DESIRED tool center point with reference to the TCP coordinate system through the light barriers without searching the crossing point (R) such that the tip of the tool corresponding to the tool center point (TCP) interrupts the light barriers successively, and deviation of the tool center point is determined from the temporally offset interruption of the individual light barriers,
    c) recording ACTUAL TCP positional coordinates upon the interruption of a respective light barrier,
    d) determining the differences between the DESIRED TCP positional coordinates for the interruption of the light barriers at a DESIRED tool center point ($TCP_{DESIRED}$) and the corresponding recorded ACTUAL TCP positional coordinates for the ACTUAL tool center point ($TCP_{ACTUAL}$), and
    e) calculating the deviation of the ACTUAL tool center point ($TCP_{ACTUAL}$) from the DESIRED tool center point ($TCP_{DESIRED}$) for the number of planes that is prescribed by the light barriers from the differences and the known position and vertex angles (a) for the light barriers.

2. The method as claimed in claim 1, characterized by correcting the TCP positional coordinates by the calculated deviation between the fixed ACTUAL TCP position coordinates by the calculated deviation of the ACTUAL tool center point ($TCP_{ACTUAL}$) from the DESIRED tool center point ($TCP_{DESIRED}$) for the planes of a coordinate system, on which the TCP positional coordinates are based.

3. The method as claimed in claim 1, characterized in that the DESIRED tool center point ($TCP_{DESIRED}$) is fixed with the aid of the TCP positional coordinates in the case of which the tool tip corresponding to the tool center point (TCP) simultaneously interrupts all the light barriers at a common crossing point (R).

4. The method as claimed in claim 1, wherein two light barriers of said at least two light barriers being provided that cross one another at a vertex angle ($\alpha$) of 90° and define a first plane of a coordinate system, and with the first light barrier corresponding to a first axis (y), and the second light barrier corresponding to a second axis (z) of the coordinate system, characterized in that the deviation of the tool center point (TCP) for the first axis (y) is determined from the deviation, determined upon interruption of the first light barrier, of the ACTUAL tool center point ($TCP_{ACTUAL}$) from the DESIRED tool center point ($TCP_{DESIRED}$), and the deviation of the tool center point (TCP) for the second axis (z) is determined from the deviation, determined upon interruption of the second light barrier, of the ACTUAL tool center point ($TCP_{ACTUAL}$) from the DESIRED tool center point ($TCP_{DESIRED}$).

5. The method as claimed in claim 1, characterized by determining the ACTUAL TCP position coordinates as mean ACTUAL TCP positional coordinates between the instant of the interruption of a light barrier and the subsequent release of the light barrier.

6. The method as claimed in claim 5, characterized by determining the tool diameter from the difference of the ACTUAL TCP positional coordinates determined at the instant of the interruption of a light barrier and the subsequent release of the light barrier.

* * * * *